United States Patent

Shin

[11] Patent Number: 5,876,181
[45] Date of Patent: Mar. 2, 1999

[54] MULTI-UNIT ROTOR BLADE SYSTEM INTEGRATED WIND TURBINE

[76] Inventor: Chan Shin, 2732-9, Bangbae 2-dong, Seocho-ku, Seoul, Rep. of Korea, 137-062

[21] Appl. No.: 750,888
[22] PCT Filed: Jun. 23, 1995
[86] PCT No.: PCT/KR95/00081
  § 371 Date: Dec. 17, 1996
  § 102(e) Date: Dec. 17, 1996
[87] PCT Pub. No.: WO96/00349
  PCT Pub. Date: Jan. 4, 1996

[30] Foreign Application Priority Data

Jun. 27, 1994 [KR] Rep. of Korea ............ 94-14892

[51] Int. Cl.$^6$ .................................................. F03D 7/00
[52] U.S. Cl. ................................... 415/2.1; 416/111
[58] Field of Search ................... 415/2.1, 4.1, 4.3, 415/4.5, 905, 906; 416/7, 11, 111, 122

[56] References Cited

U.S. PATENT DOCUMENTS

| | | | |
|---|---|---|---|
| 2,183,195 | 12/1939 | Kane | 418/111 |
| 2,563,279 | 8/1951 | Rushing | 415/4.3 |
| 3,762,669 | 10/1973 | Curci | 418/111 |
| 4,213,057 | 7/1980 | Are | 418/11 |
| 4,311,435 | 1/1982 | Bergero | 418/11 |
| 5,506,453 | 4/1996 | McCombs | 290/44 |

FOREIGN PATENT DOCUMENTS

| | | |
|---|---|---|
| 742242 | 11/1943 | Germany . |
| 188782 | 11/1982 | Japan . |
| 481014 | 2/1938 | United Kingdom . |

*Primary Examiner*—John T. Kwon
*Attorney, Agent, or Firm*—Watson Cole Grindle Watson, P.L.L.C.

[57] ABSTRACT

The described wind turbine has a set of propeller type wind force collecting rotor turbines which is comprised of an up-wind auxiliary rotor blade turbine, being disposed on the front end of the combined bevel-planet gear assembly, and a down-wind main rotor blade turbine together with attached extender having twice the radius of the auxiliary rotor turbine. These rotor blades rotate in opposite directions with respect to one another, and the extender enables the main turbine to be activated by normal wind speed without aerodynamic wake turbulence effects created by the movement of the auxiliary rotor blade. The super-large scale, integrated, multi-unit rotor blade wind turbine has four sets of wind force collecting rotor blade turbines composed of an auxiliary up-wind rotor turbine and three down-wind rotor turbine units evenly spaced around a central pivotal rotor hub on extenders which are the same length as the radius of the auxiliary turbine blade. The above described wind turbines are provided with a microprocessor pitch control system thereby achieving a highly efficient stall and storm control operation.

20 Claims, 9 Drawing Sheets

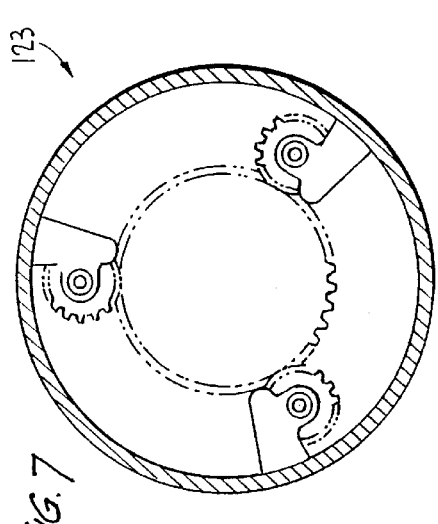
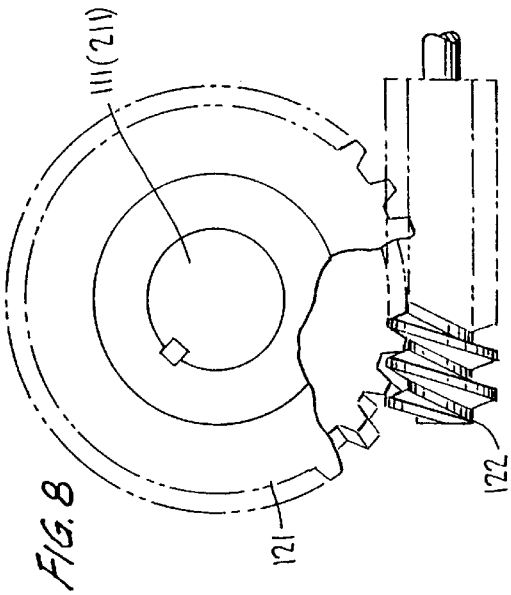
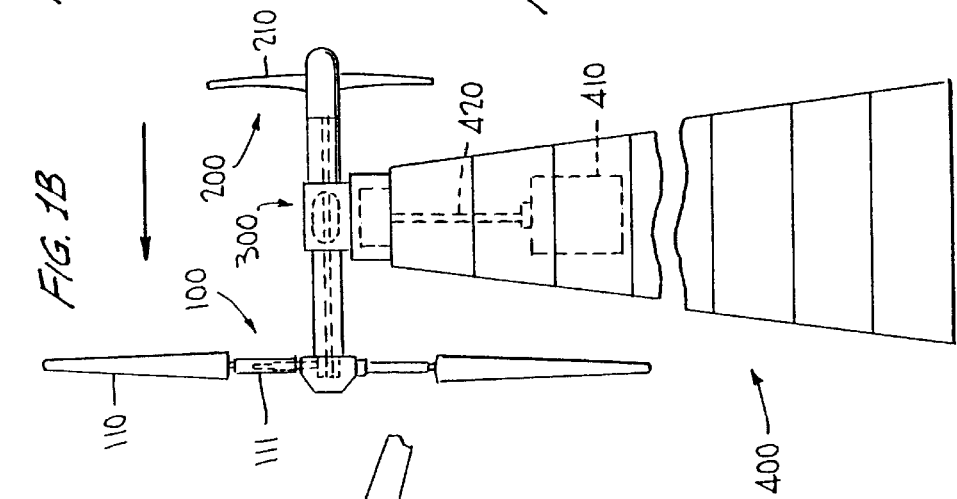
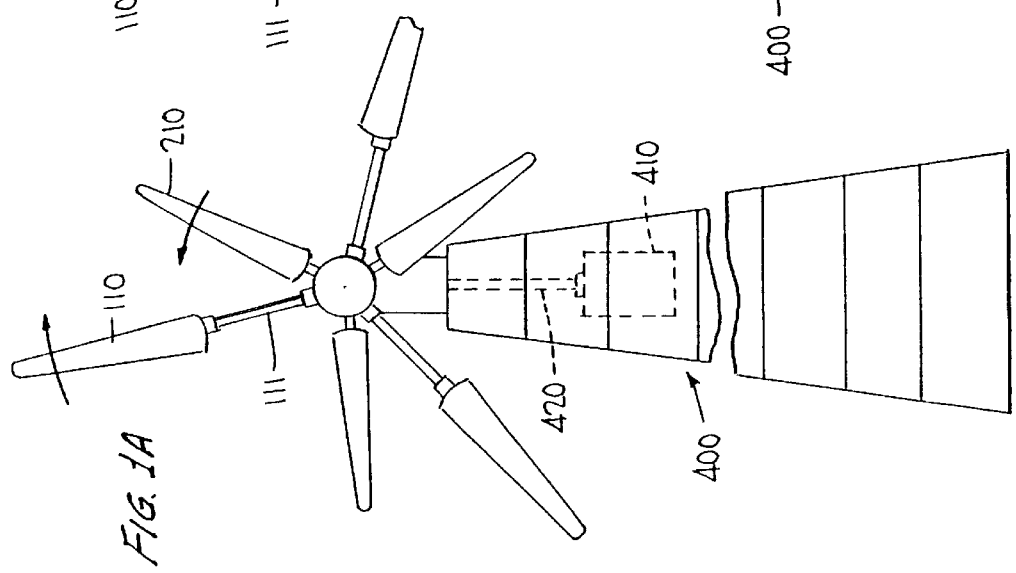

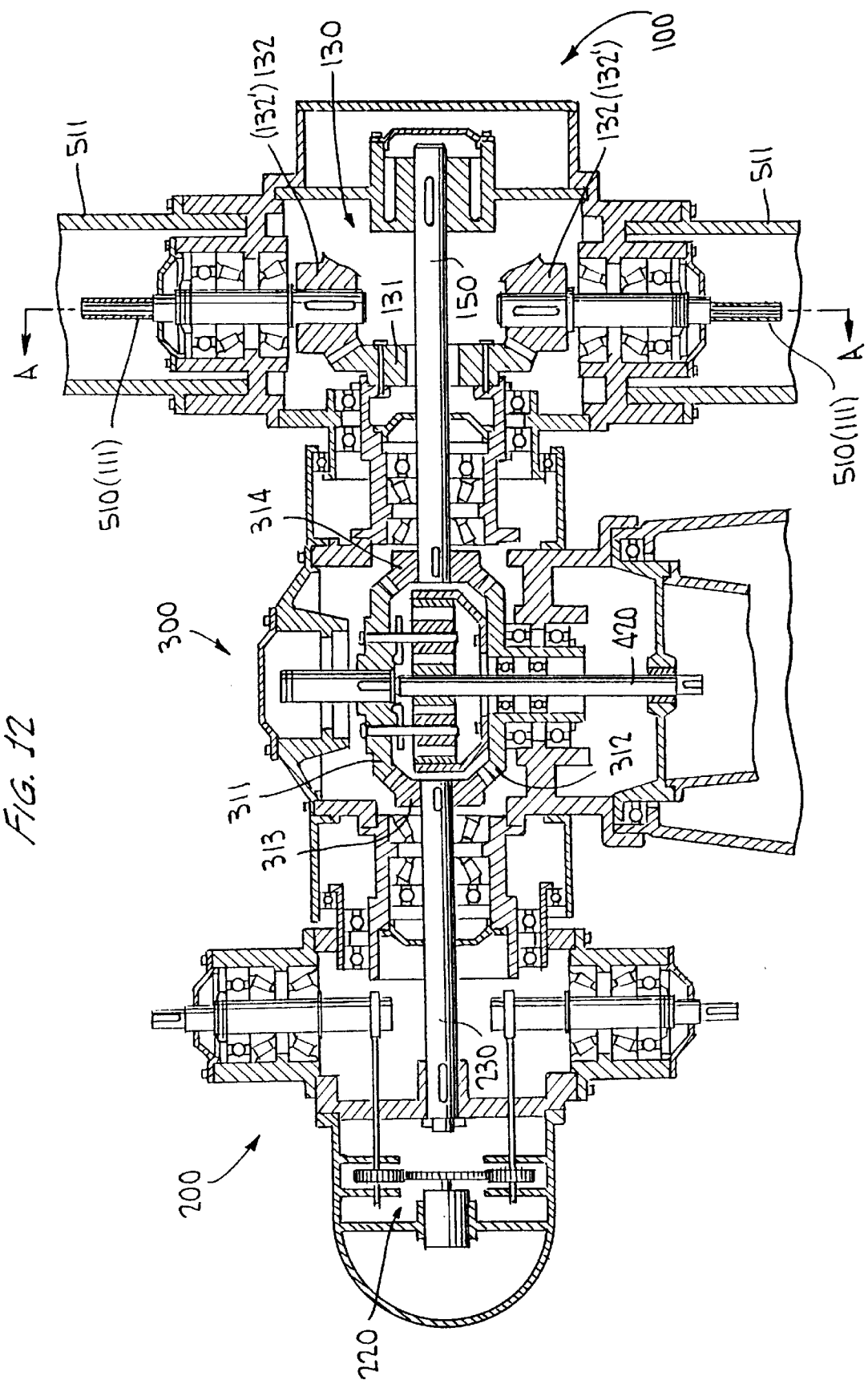

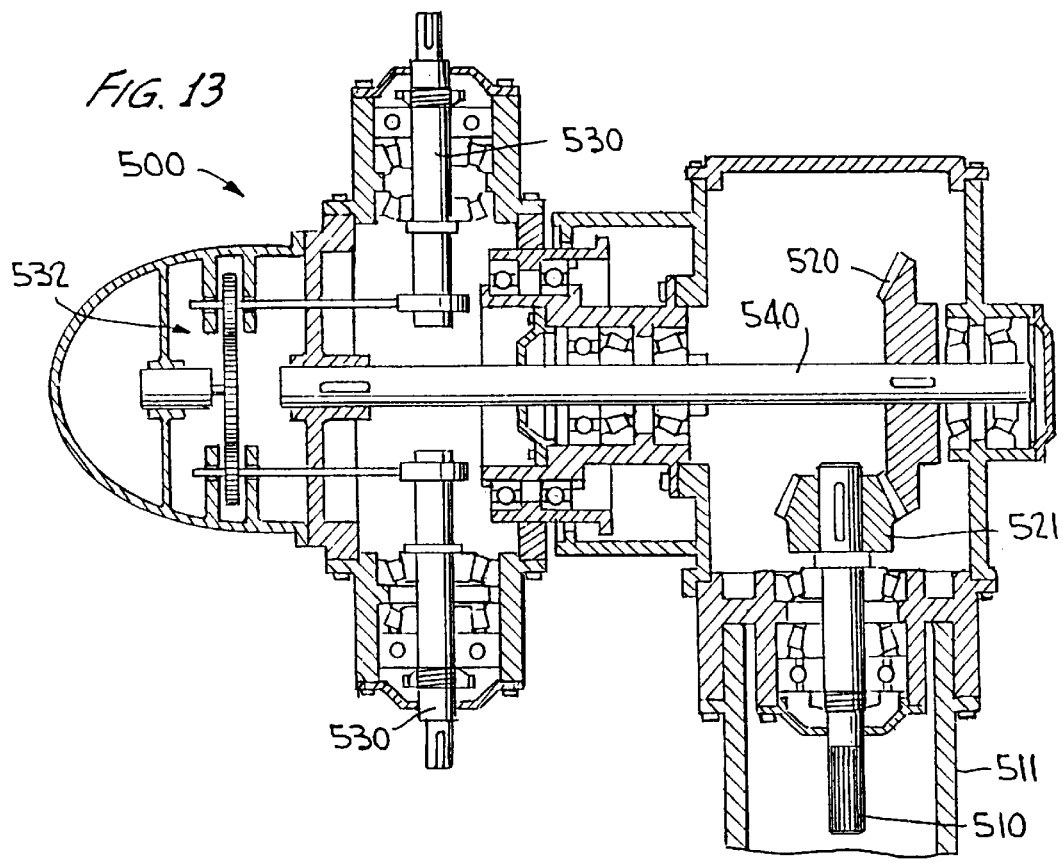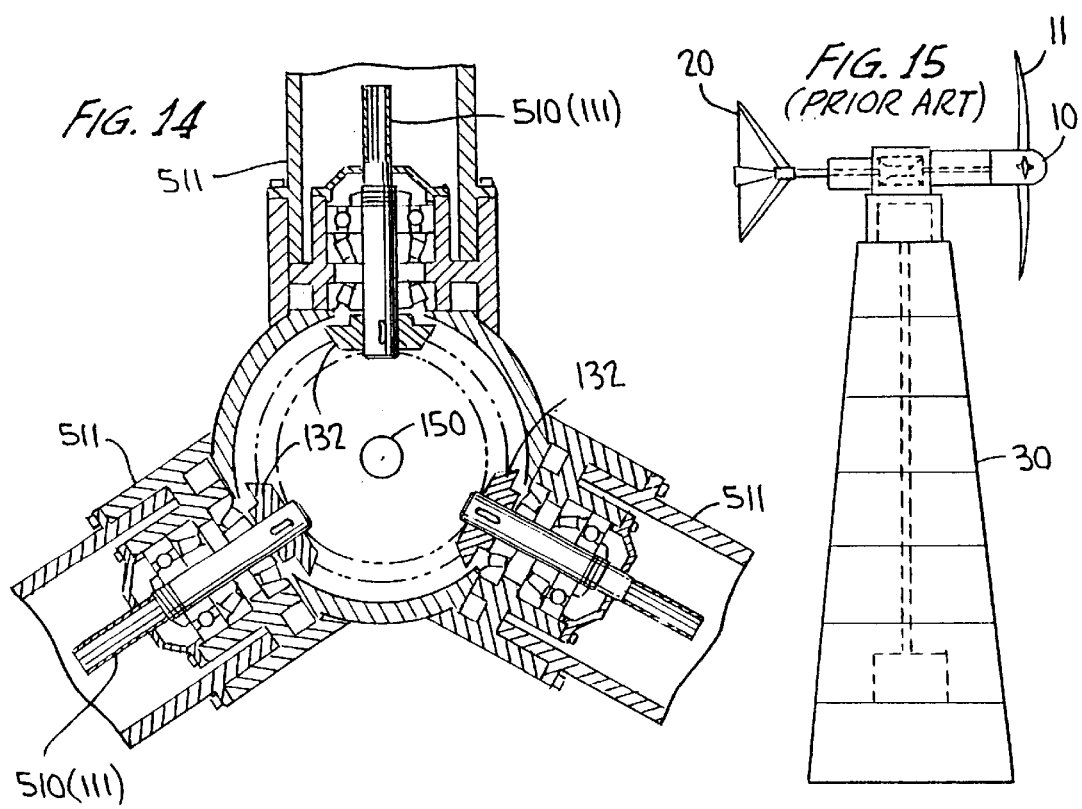

MULTI-UNIT ROTOR BLADE SYSTEM INTEGRATED WIND TURBINE

TECHNICAL FIELD

The present invention converts natural wind energy into electrical energy by increasing the speed of input rpm in a highly efficient integrated bevel-planet gear box, and through the multi-unit rotor blade system using a propeller-type wind mill generator.

BACKGROUND ART

Wind is one of the oldest forms of energy used by man. With enormous increases in demand for environmentally friendly sources of energy, plus a growing fossil-fuel shortage, development of alternative energy sources has been stimulated. In this same environment, wind conversion systems are becoming more efficient and competitive, generating amounts of electrical energy large enough for commercial use. However, in order to meet global clean energy needs, it will be necessary to adopt a new approach to wind-generated electrical energy production.

There are two major challenges to a developer of a wind energy conversion system: overall energy conversion efficiency and fluctuations in wind speed and direction. The lower potential power output of wind energy dictates that an advanced conversion system must be of considerable size if substantial amounts of electrical power are to be generated.

Taking the above matter into account, the present invention provides a more efficient and improved system which is based on the Prior Art system patented in Korea under No. 057585 and in the U.S. Pat. No. 5,222,924.

After experimental field testing, it became apparent that the counter-rotation of the main and auxiliary rotor blades of the Prior Art in the wind turbine system (FIG. 15) had need of improvement. For example, the main rotor blade of the Prior Art is disposed in the front of the tower in an up-wind position, while the auxiliary rotor blade is mounted in a down-wind position functioning as a tail in order that the wind turbine may face into the wind as the direction varies. However, the up-wind position of the main rotor blade created radius limitations due to the narrow space between the tip of the blade and the tower. When the wind blew, the rotor blade was bent toward the tower, finally touching it, with longer blades bending more easily. Rotational tip speed, then, was limited with respect to the constraints imposed on the length of the blade's radius.

A second structural configuration deficiency was the bevel and planet gear box. In the Prior Art, the sections are separated into an upper bevel gear member and a lower planetary gear member.

The design required a complicated lubrication system as well as extraneous components which curbed operational and mechanical efficiency.

DISCLOSURE OF INVENTION

The present invention is distinguished from the Prior Art in that it is comprised of an improved wind turbine having one auxiliary up-wind rotor blade in a counter-rotational relationship to a main down-wind rotor blade attached to an extender. The up-wind auxiliary rotor blade is positioned in front of the combined bevel and planet gear box, and the down-wind main rotor blade is mounted in the rear, respectively.

The radius of auxiliary rotor blade is one-half the length of the extender and the main rotor blade radius combined. The two rotational speeds of the main and auxiliary blades have a coincidental tip speed ratio ($\lambda=V_1/Vo$, Vo:Wind speed m/s, Vi:tip speed of rotor blades m/s) which reaches an optimum tip speed ratio independent of wind speed variance. One of the special features of the combined bevel-planet gear device is that the two discrete horizontal input rotational forces of the auxiliary and main rotor turbines are converted into a single higher rotational force which is imparted to the perpendicularly positioned generator located immediately beneath the gear box.

Accordingly, the first objective of the present invention was to provide an improved, highly rigid, compact, combined bevel-planet gear assembly which could convert two rotational forces into one to generated electrical energy throughout the period of operation of a wind turbine disposed on the top of a tower, and to provide a generator system arranged perpendicular to the gear box, whose two horizontal, counter-rotating, input shaft's yielded energies entered the bevel-planet gear box, where they were integrated, and then transmitted to the vertical rotor shaft of the generator.

A further objective of the present invention 10 was to avoid aerodynamic wake turbulence effects, such as weakened wind stream velocity, through the provision of an extender the same length as the auxiliary blade radius, leading from the rotor hub to the main rotor blade anchor. The wind passes through the auxiliary rotor, activating the main rotor by normal wind velocity alone, without it being disturbed by the wake of the auxiliary rotor turbine.

Objective number three of the present invention was to provide.

Objective number four of the present invention was to take advantage of this hybrid wind turbine system to function at high rotational speeds as well as at high torques similar to a combination of the American multi-blade low speed, high torque wind turbine and the Danish high speed low torque wind turbine.

Furthermore, several significant advantages were derived from the fact that no yaw control system was required since the system was omnidirectional, i.e., the preferred embodiment of the physical structure of the two rotor turbine system achieved an automatic adjustment to accept the wind from any direction.

Also, the variable speed operation meant that this wind energy converter system adjusted automatically to changes in wind velocity for maximum efficiency. As a result, rotor speed, blade pitch and optimum tip speed ratio were automatically aligned to obtain the peak performance.

A function of the electronic pitch control actuator was to act as a stall regulator/storm control device which turns the rotor blades in order to deactivate the generator in the event wind velocity exceeded a level necessary for the safe operation of the system.

This represented an ideal solution for interrupting operations and initiating an emergency stall when necessary, and it was superior to a conventional braking system because it avoided the stresses to the system created by forcible stalling using a mechanical friction brake system.

A principal objective of the present invention was to provide an advanced super-large scale wind conversion system consisting of an integrated, multi-unit rotor blade wind turbine system. It is generally known that the conventional large scale wind turbine system has several technical weak points. The first is its rotor diameter limitations. According to general aerodynamic theory, the output power of a generator is proportional to the square of the sweeping area of the blade.

However, the length of the radius of the rotor blade has also been limited by difficulties in manufacturing longer blades which are aerodynamically balanced.

To minimize these obstacles, the present invention integrates a multi-unit rotor blade system to create a super-large wind machine.

As shown in FIG. 10, it was achieved through the use of three extenders revolving around a main rotor hub, each of which has a rotor blade unit positioned at the apex. The individual rotors rotate clockwise, while the total assembly unit revolves counter clockwise, effectively canceling the outer motion speed created by the individual rotor blade units.

BRIEF DESCRIPTION OF DRAWINGS

The aspects, uses and advantages of the present invention will be more fully appreciated as the same becomes better understood through the following detailed descriptions of the accompanying drawings:

FIG. 1(A) is the front elevational view of the present invention.

FIG. 1(B) is the side elevational view of the present invention.

FIG. 7 is an enlargement of the section along the D—D line of FIG. 2.

FIG. 8 is an enlargement of detail E in FIG. 2.

FIG. 12 is a sectional view of the physical structure of the rotor blade system introduced in FIG. 9.

FIG. 13 is a sectional view of physical structure of the main unit turbine illustrated in FIG. 12.

FIG. 14 is a detailed view of the section along the A—A line of the main unit presented in FIG. 12.

FIG. 15 is a side elevation of a conventional wind turbine, a.k.a. Prior Art.

BEST MODE FOR CARRYING OUT THE INVENTION

Figure 2:
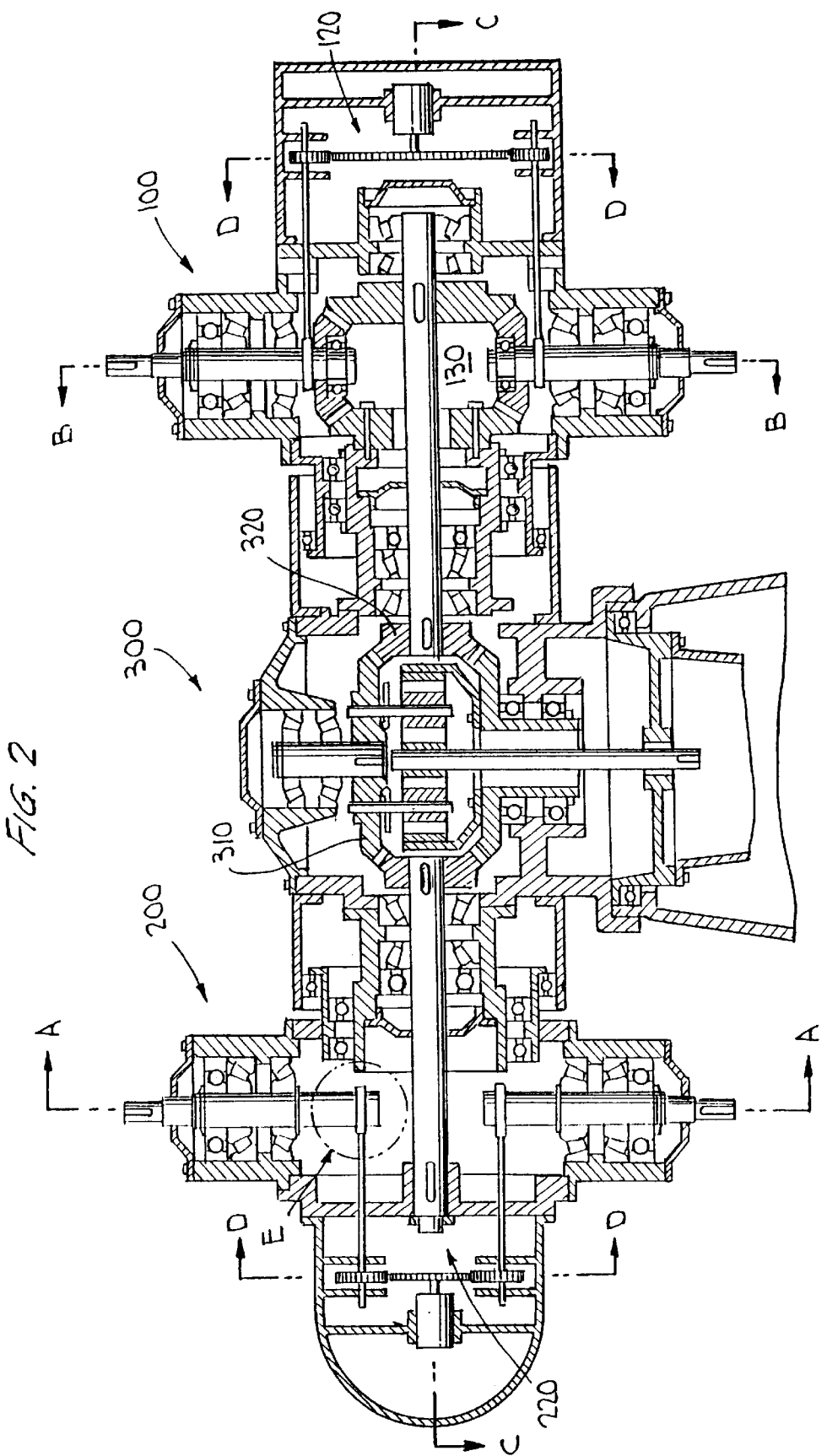
FIG. 2 is a sectional view of the combined bevel-planet gear box assembly of the present invention.

In reference to details regarding illustrations of the preferred designs of the present invention, i.e., the integrated, multi unit rotor blade system, as shown in FIG. 1(A), FIG. 1(B) and FIG. 2, it is comprised of a main rotor blade (110) attached to the rotor turbine (100)

auxiliary rotor blades(210) attached to the rotor turbine (200)

the combined bevel-planet gear assembly (300)

a pitch control actuator (120) for the main rotor blade (110) on the rotor turbine(100)

the differential gear members (130) of the main rotor blade (110)

a pitch control actuator (220) for the auxiliary rotor blades (201) on the rotor turbine (200)

a vertical output shaft (420) leading from the combined bevel-planet gear assembly (300)

a vertical generator (410), which is mounted within the tower (400) directly beneath the gear box assembly (300)

As shown in FIG. 1 (B), the up-wind auxiliary rotor 20 blade (210) on the rotor turbine (200) has a radius half length of the extender and main rotor blade (110) combined, being disposed on the rear end of the gear assembly (300), and it operates in a counter-rotational manner to the main rotor blade (11C) at an identical rotational tip speed. This configuration keeps the turbine facing into the prevailing wind at all times.

The auxiliary rotor turbine (200) is nearly half size of the main rotor turbine (100) and consists of a three-bladed rotor (210) attached by a shaft (211) to the rotor turbine (200), which rotates at nearly double the speed of the main rotor turbine (100). The main rotor turbine (100) consists of a three-bladed rotor blade (110) with an extender (111) continuing from the main rotor turbine hub assembly of the combined bevel-planet gear assembly (300) to the anchor point of the main rotor blade (110).

The length of the extender (111) from the main rotor blade (110) is almost equivalent to the length of the auxiliary rotor blade (210) of auxiliary rotor turbine (200). This allows the main rotor turbine (100) to perform effectively in normal wind conditions without wake turbulence effects caused by the auxiliary rotor turbine (200).

Figure 3:
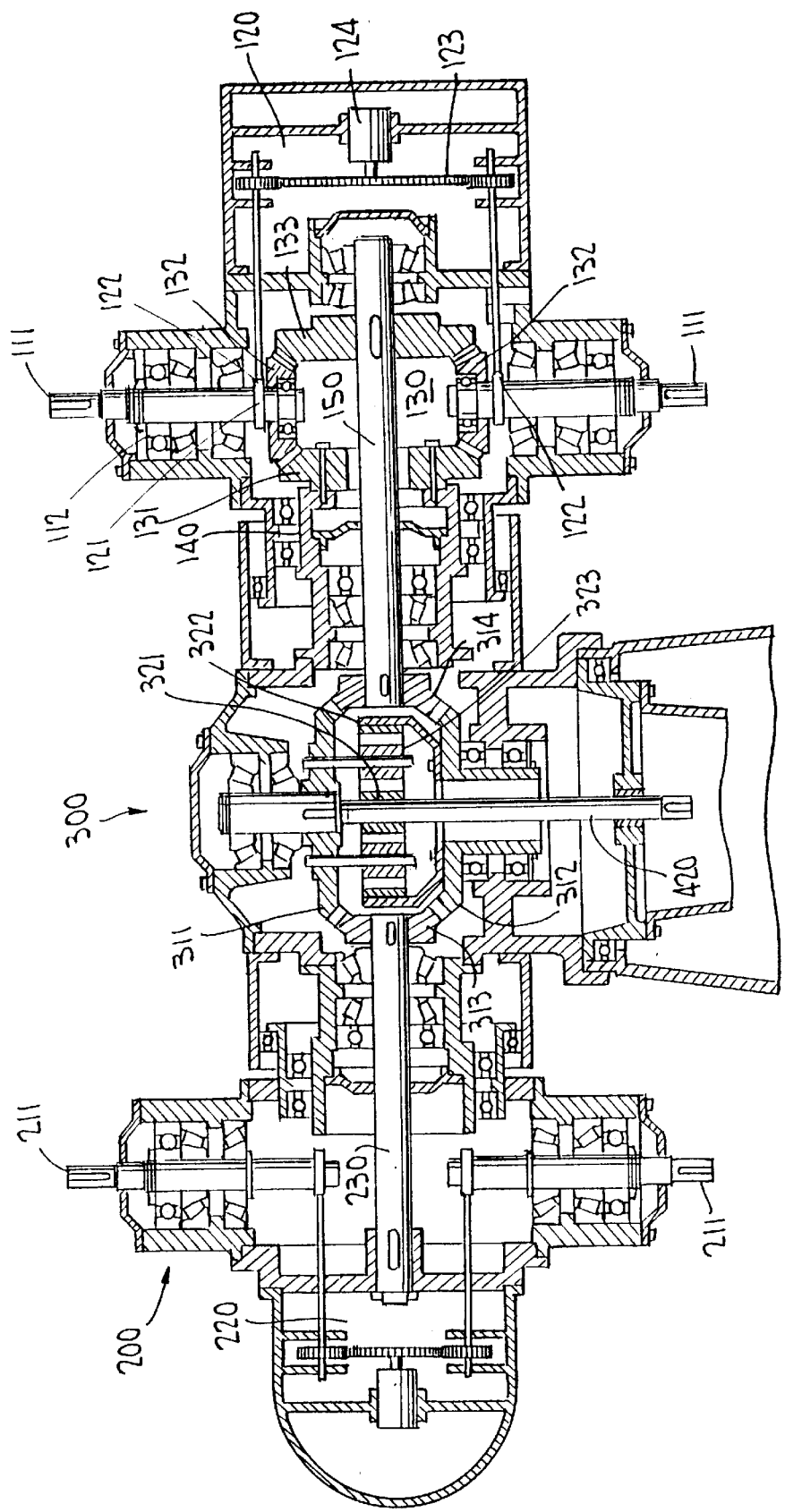
FIG. 3 is a sectional detail of the FIG. 2 illustration.

As shown in FIG. 3, the combined gear assembly (300) includes horizontally-positioned bevel gear (311).

This gear (311) is faced by its counter part, a lower bevel gear (312). A plurality of three planet gears (323) are affixed to the inward face of bevel gear (311). A ring gear (322) is rigidly attached to the inward face of bevel gear (312).

The planet gear spider consists of planet gears (323) which are attached to bevel gear (311) and a ring gear (322) which is attached to bevel gear (312) inclusively. At the same time, the upper bevel gear (311) and lower bevel gear (312) are perpendicularly disposed in a geared relationship to the vertically positioned bevel gears (313) and (314).

The bevel gear (313) is fixed to one end of the input rotary shaft (230) leading from the auxiliary rotor turbine (200). The bevel gear (314) is fixed to the input rotary shaft (150) of the main rotor turbine (100). Both of these are disposed in a geared relationship to the upper (311) and lower bevel gear (312).

Both bevel gear (311) and (312) respond to the main rotor turbine's (100) rotation and rotate in the opposite direction at an identical speed from bevel gear (313) and (314), which respond to the auxiliary rotor turbine's (200) rotation, respectively.

Figure 6:
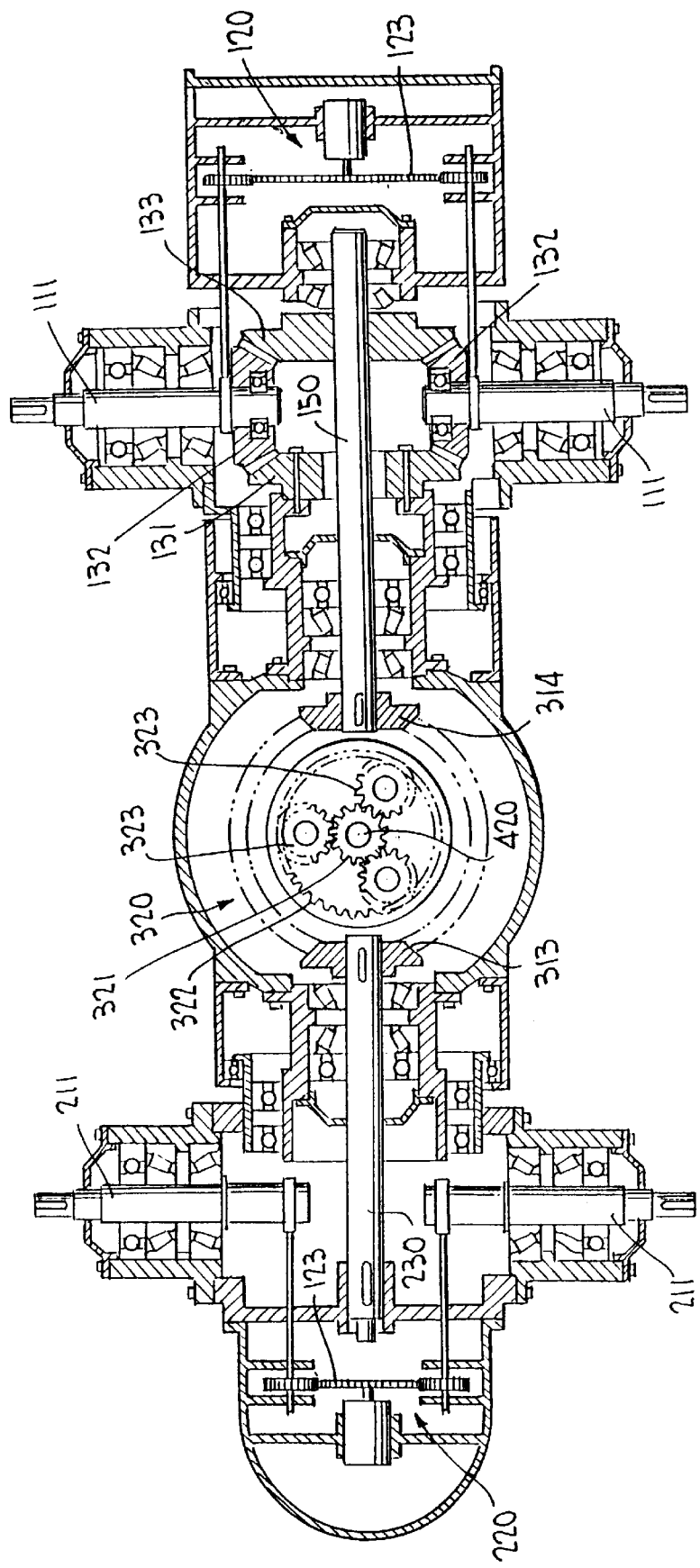
FIG. 6 is a detailed view of the top of the section along the A—A line presented in FIG. 2.

Looking now at both FIG. 3 and FIG. 6, subsequent to the above described mechanism, the sun gear (321), which is disposed at the center of the planet gear spider, rotates in a geared relationship to the three planet gears (323), which rotate in a respective pivotal axis, revolving around the sun gear (321); while the ring gear (322), which is in a geared relationship with the planet gears (323), rotates in the opposite direction.

As described above, the rotational input force of the auxiliary rotor turbine (200) and the main rotor turbine (100) are combined in the compact bevel-planet gear assembly (300) device, which is composed of a set of planetary member; three planet gears (323), a ring gear (322), a sun gear (321), and a pair of vertical bevel gears (313) (314), a pair of horizontal bevel gears (311) (312), which are integrated in a "T" shaped gear box assembly.

Further, the two low speed input rotary shafts located in the horizontal position are geared into one high speed output rotary shaft located in the vertical position, all within one compact gear box.

Figure 5:
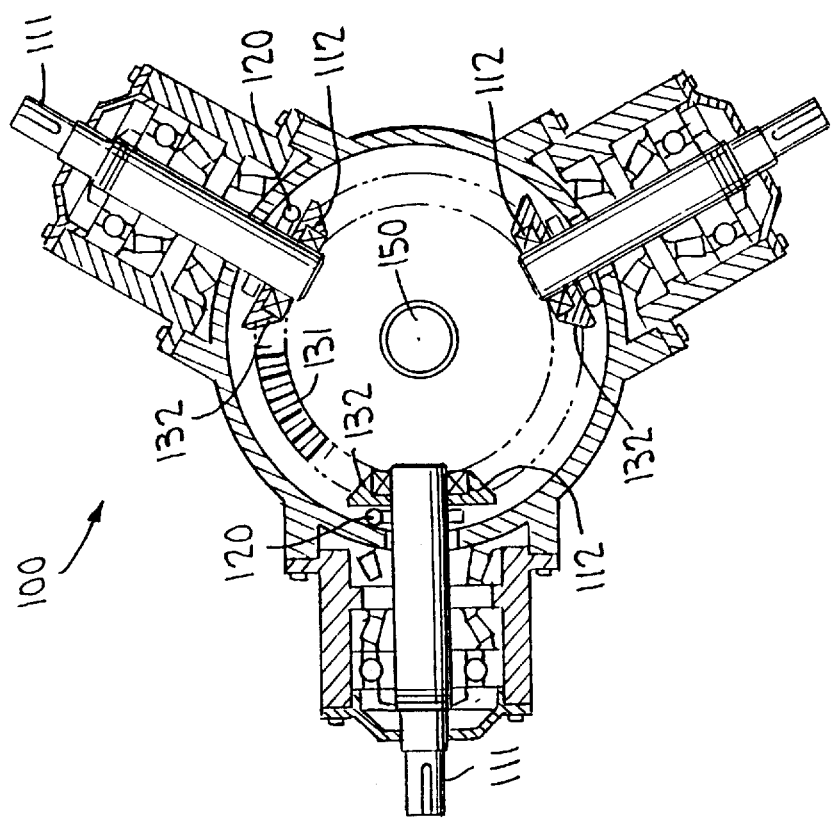
FIG. 5 is a detailed view of the section along the C—C line of the bevel-planet gear assembly presented in FIG. 2.

In reference to detailed illustrations in FIG. 3 and FIG. 5, the input rotor hub of the main rotor turbine (100), as diagrammed, is a preferred embodiment of the input differential gear member (130) (see FIG. 3) enhancing efficiency, in theory, by a doubling of rpm from the input speed of the main rotor turbine (100) so as to match the tip speed of the auxiliary rotor turbine (200). The input differential gear member (130) is comprised of a fixed, vertical bevel gear (131) attached to frame (140) (see FIG. 3) and an opposing vertical rotating bevel gear (133) which is coupled to the main rotor blade (100) (see FIG. 3) of turbine (100).

Figure 4:
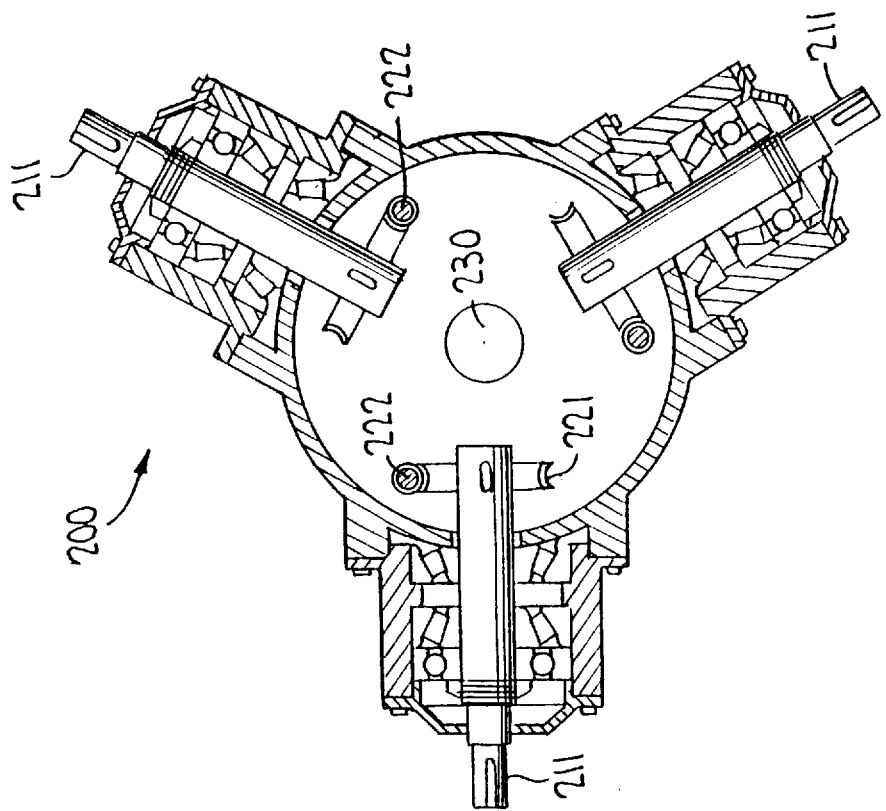
FIG. 4 is a detailed view of the section along the A—A line of the bevel-planet gear box assembly presented in FIG. 2.

The input rotary shaft (150) (see FIG. 3] extends from the input vertical bevel gear (314) to the three revolving bevel gears (132) (see FIG. 3 and FIG. 5). Associated bearings (112), located at one end of each extender (111) of the main rotor blade (110) of the main rotor turbine (100), revolve around the [fixed bevel gear (131), in gearing] stationed bevel gear (131), engaging with bevel gear (133). The differential gear system is attached to the input rotary shaft (150) in order to permit a matching speed with rotary shaft (230) allowing the auxiliary rotor turbine (200) to turn at double the speed of the main rotor turbine (100) both of whose energy input is then imparted to the combined bevel-planet gear assembly (300) (see FIG. 3 and FIG. 4).

Consequently, the total rotational output number (20) of the vertical output rotary shaft (420) (FIG. 2 and FIG. 3) attached to combined bevel-planet gear assembly (300) is Zo=(ZS+2ZR/ZS)X 2n, wherein "ZS" represents the number of teeth of sun gear (321), "ZR" represents the number of teeth of ring gear (322) and "n" represents the number of input rotations of main rotor turbine (100).

Figure 9:
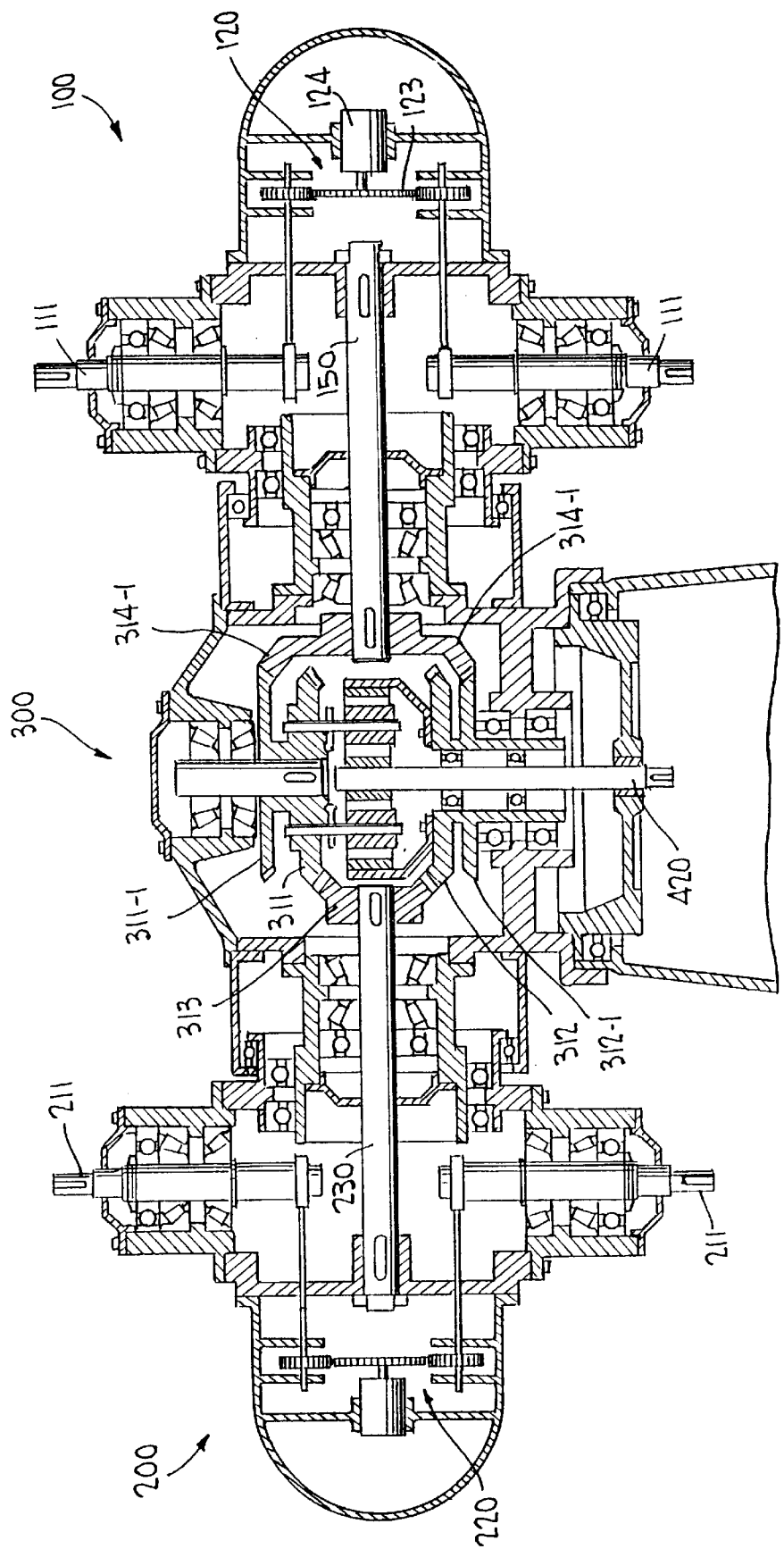
FIG. 9 is a sectional view of another functional embodiment of the combined bevel-planet gear assembly of the present invention.

In FIG. 9, an alternative structural embodiment of the present invention is depicted, where the main rotor turbine (100) and auxiliary rotor turbine (200), integrated with the combined bevel-planet gear assembly (300) are consistent with the equation Zo=(ZS+2ZR/ZS)X 2n through the addition of upper horizontal bevel gear (311-1) and lower horizontal bevel gear (312-1) being disposed in the same pivotal axis as bevel gear (311) and (312), and which are in a geared relationship with bevel gear (314-1), which is twice the size of the originally described bevel gear (314). The input rotary shaft (150) connects bevel gear (314-1) to the main rotor blade turbine (100). The resulting operational performance function of the various gears is exactly the same as that of the input differential bevel gears (130) of the main rotor turbine (100) described in FIG. 3.

Figure 11:
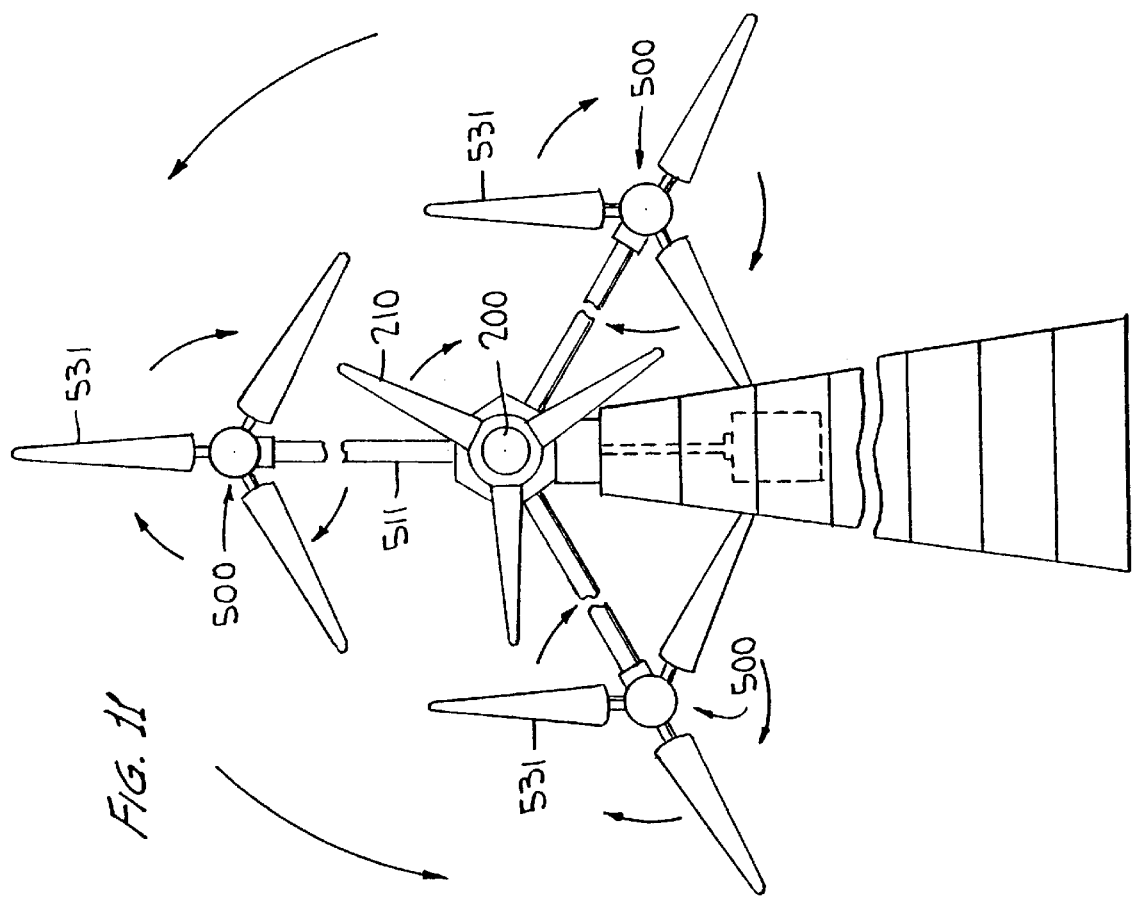
FIG. 11 is a front elevation of FIG. 10.
Figure 10:
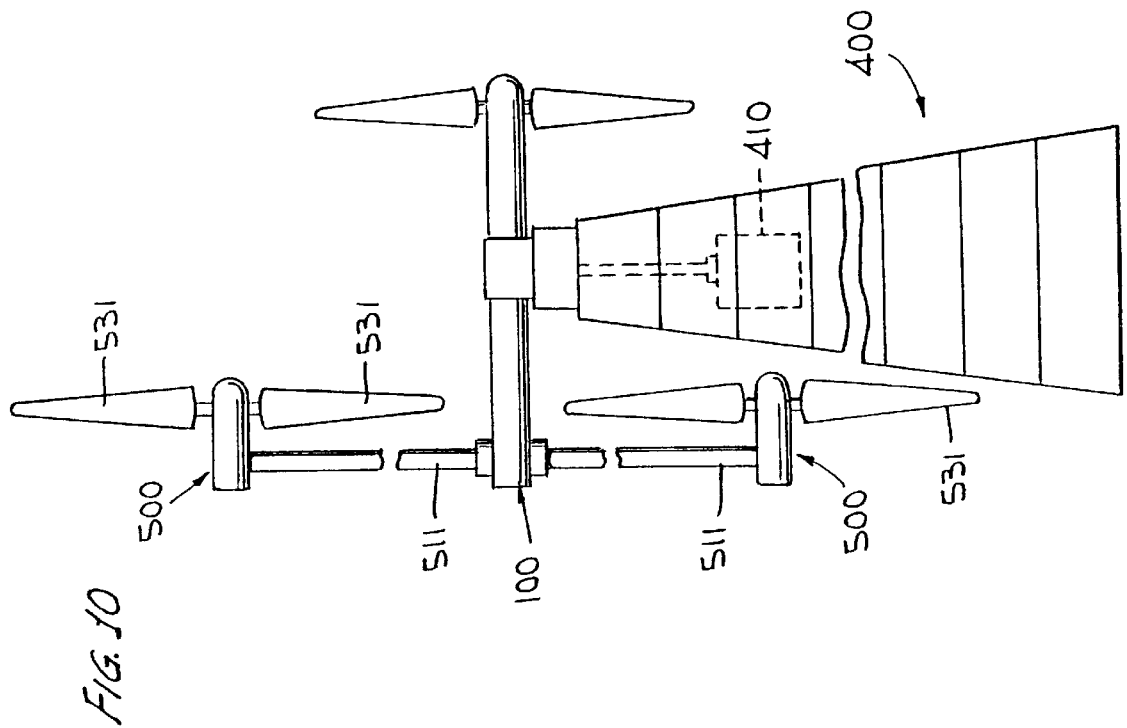
FIG. 10 is the side elevation of a super-large, integrated, multi-unit rotor blade wind turbine of the present invention.

Turning now to the side and front elevation views of the super-large scale multi-rotor blade turbine integrated wind conversion system depicted in FIG. 10 and FIG. 11, it is now in order to describe in detail the component parts and their relationship in both structure and function.

The composite wind turbine system of the present invention is intended to provide a super large sweeping area formed by an upwind auxiliary rotor turbine (200) attached to front end of combined bevel-planet gear assembly (300 along with three main down-wind multi-unit rotor turbine (500), each of which has a unit rotor blade (531) (see FIG. 13) mounted on a hollow support extender (511) and an input axle shaft (510) of the main multi-unit rotor turbine (500) to the input bevel gears (520) and (521), and through extender (511) to the coupled bevel gear (132,132') of the main rotor hub assembly positioned rear end of combined bevel-planet gear assembly (300) referred to in FIG. 12, FIG. 13 and FIG. 14.

The rotational forces of the unit rotor blade (531) of main multi-unit rotor turbines (500) are imparted to the input vertical bevel gears (520), which are in a geared relationship with the horizontal bevel gears (521) (see FIG. 13). The forces are transferred through input axle shaft (510) to the bevel gears (132,132') (see FIG. 12 and FIG. 14), which are affixed to the end of input axle shaft (510,111) and which are revolving around the fixed bevel gear (131). The main hub of rotor turbine assembly has the three main multi-unit rotor turbines (500) rotating around the bevel gear (131) [which is then coupled to the input rotary shaft (150)]. Similar functions of operational principles are described here-to-fore in relation to FIG. 3 and FIG. 9.

As shown in FIG. 11, the rotational direction of unit rotor blade (531) of rotor turbine (500) is in a clockwise direction, while the main rotor hub assembly of the attached supporting extenders (511) leading to the unit rotor turbines (500) is revolving in a counter-clockwise direction. consequently, when the rotational speeds are identical and the proper configuration of rotational input bevel gears (520), (521), fixed bevel gear (131) and orbital input bevel gears (132, 132') exists, the outward orbital tip speed of the unit rotor blade (531) of rotor turbine (500) is counter balanced by the opposing rotational speed of the supporting extender (511) of the main rotor hub assembly.

One of the important features of the present invention is the pitch control feathering mechanism used in both normal and stormy wind conditions.

The pitch control actuator (120) of the main rotor blade (110) of rotor turbine (100), the auxiliary rotor turbine (220) and the control actuator (532) for rotor blade (531) of rotor turbine (500) are feathered independently (see FIG. 3, FIG. 9, FIG. 12 and FIG. 13). This maintains an optimum tip speed ratio during variable wind speed operation. It also initiates a stall mechanism for assuring the survival in extremely strong wind conditions.

Referring to FIG. 3, FIG. 9, FIG. 12 and FIG. 13, the pitch control actuators (120), (220) and (532) are composed of a actuator motor (124), which can rotate clockwise or conter-clockwise with actuating gear members (123) (see FIG. 7) and associated worm gear (122) and worm wheel (121) (see FIG. 8).

The main rotor turbine (100) and auxiliary rotor turbine (220) are independently controlled by a microprocessor which monitors all wind data through a wind velocity meter and monitors the individual rpm's of both the auxiliary (220) and main turbines (100) so as to keep the same optimum tip speed ratio for all three unit rotor turbines (500).

Detail "E" for FIG. 2, as shown enlarged in FIG. 7 and FIG. 8, illustrated the component parts of the pitch control (120), (220) (see FIG. 2) and (532) (see FIG. 13) and their relationship operationally and functionally.

The first is the start up function whereby the microprocessor adjusts the obtuse angle of the blade, and the blade begins to turn in response to rotatable wind speed being applied for a predetermined period of time. The actuator motor (124) rotates the activating gear member (123) coincidentally with the worm gears (122) in synchronization with worm wheels (121) which are affixed to the extended axle shaft of rotor blades (111) and (211) (see FIG. 3) and axle shaft (530) of the unit rotor turbine depicted in FIG. 13. This adjusts the pitch angle of the blades of the rotor turbine.

The second function of the actuator motor (124) is to keep an optimum tip speed ratio in various wind speed conditions by continuously rotating in a clockwise or counterclockwise direction depending on the control signal received from the microprocessor.

The third function is a storm control regulated stall. As exceedingly strong wind forces are applied over the rotor turbines, the storm control mechanism is activated, changing the rotor blade pitch to keep the turbine from turning.

The emergency stop control thereby operates manually rather than by the use of a mechanical frictional braking system. These functions are performed by preloaded software located in the microprocessor.

Numerous modifications and variations of the present invention are possible, such as modifiable single blade rotors, multi-blade rotors, composite individual unit turbines or multi-unit turbines. Also, the rotational direction of the auxiliary and main rotor turbines can be made either counter-rotating or single directional be simply adding gearing devices to either the auxiliary or main rotor turbine.

All such modifications are intended to be included within the scope of this present invention as defined by the following claims.

What is claimed is:

1. A rotor blade system integrated wind turbine comprising, support means, a gear assembly supported by said support means, an auxiliary turbine and a main turbine drivingly connected to said gear assembly, each of said turbines including a plurality of turbine blades being mounted for rotation in substantially parallel planes, the auxiliary turbine blades being mounted for rotation about an axis, said main turbine blades being disposed downwind of said auxiliary turbine blades, each of said blades having an innermost portion and a tip, the tips of said auxiliary blades defining a first circle during rotation thereof, the innermost portion of said main turbine blades defining a second circle during rotation thereof, the tips of said main turbine blades defining a third circle during rotation thereof, the circle defined by the main turbine blades which is nearest to said axis being spaced from said axis by a distance substantially equal to the radius of said first circle so that the main turbine blades are not disturbed by the wake of said auxiliary turbine blades.

2. A rotor blade system integrated wind turbine as defined in claim 1, wherein said main turbine blades rotate in a direction opposite to the direction of rotation of said auxiliary turbine blades.

3. A rotor blade system integrated wind turbine as defined in claim 1, wherein said main and auxiliary turbine blades rotate in the same direction.

4. A rotor blade system integrated wind turbine as defined in claim 1, wherein the rate of rotation of said auxiliary rotor blades is greater then the rate of rotation of said main rotor blades so that the tip speed ratio of said auxiliary rotor blades and said main rotor blades are substantially the same.

5. A rotor blade system integrated wind turbine as defined in claim 1, further including means for adjusting the pitch of said auxiliary turbine blades and said main turbine blades.

6. A rotor blade system integrated wind turbine comprising, support means, a gear assembly supported by said support means, an auxiliary turbine and a main turbine drivingly connected to said gear assembly and being mounted for rotation about a common axis, each of said turbines including a plurality of turbine blades extending substantially perpendicular to said axis and being mounted for rotation in substantially parallel planes, the blades of said main turbine being disposed downwind of the blades of said auxiliary turbine, each of said blades having an innermost portion and a tip, the tips of said auxiliary blades defining a first circle during rotation thereof, the innermost portions of said main turbine blades defining a second circle during rotation thereof, the radius of said second circle being substantially equal to the radius of said first circle so that the main turbine blades are not disturbed by the wake of said auxiliary turbine blades.

7. A rotor blade system integrated wind turbine as defined in claim 6, wherein said main turbine blades rotate in a direction opposite to the direction of rotation of said auxiliary turbine blades.

8. A rotor blade system integrated wind turbine as defined in claim 6, wherein said main and auxiliary turbine blades rotate in the same direction.

9. A rotor blade system integrated wind turbine as defined in claim 6, wherein the rate of rotation of said auxiliary rotor blades is greater then the rate of rotation of said main rotor blades so that the tip speed ratio of said auxiliary rotor blades and said main rotor blades is substantially the same.

10. A rotor blade system integrated wind turbine as defined in claim 6, wherein said auxiliary turbine and said main turbine have outputs, said gear assembly including means for mechanically combining said outputs to provide a single system output.

11. A rotor blade system integrated wind turbine as defined in claim 6, wherein the gear assembly comprises main and auxiliary input shafts being collinear with said axis, the main input shaft being connected to the main turbine, and the auxiliary input shaft being connected to the auxiliary turbine, an output shaft positioned perpendicular to the input shafts, said input shafts being connected by bevel gears to planetary gearing including a sun gear connected to said output shaft.

12. A rotor blade system integrated wind turbine as defined in claim 6, wherein the gear assembly comprises auxiliary and main input shafts being collinear with said axis, a pair of horizontal bevel gears, a pair of vertical bevel gears meshed with said horizontal bevel gears, one of said vertical bevel gears being connected to the auxiliary input shaft and the other of said vertical bevel gears being connected to the main input shaft.

13. A rotor blade system integrated wind turbine as defined in claim 6, wherein the gear assembly comprises first upper and lower horizontal bevel gears and a first vertical bevel gear positioned about said axis and meshed with the first upper and lower horizontal bevel gears, and second upper and lower horizontal bevel gears and a second vertical bevel gear positioned about said axis and meshed with the second upper and lower horizontal bevel gears, the second upper horizontal bevel gear being attached to the first upper horizontal bevel gear, said second lower bevel gear being attached to the first lower horizontal bevel gear, said first vertical bevel gear being connected to the auxiliary turbine and said second vertical bevel gear being connected to the main turbine.

14. A rotor blade system integrated wind turbine comprising, support means, a gear assembly supported by said support means, an auxiliary turbine drivingly connected to said gear assembly and being mounted for rotation about a first axis, a plurality of main turbines drivingly connected to said gear assembly, said main turbines being mounted for rotation about a plurality of axes parallel to, equidistant from and symmetrically distributed about said first axis, each of said turbines including a plurality of turbine blades extending substantially perpendicular to the axis of the associated turbine and being mounted for rotation in substantially parallel planes, the blades of said main turbine being disposed downwind of the blades of said auxiliary turbine, each of said blades having an innermost portion and a tip, the tips of said auxiliary blades defining a first circle during rotation thereof, the tips of the blades of each of the main turbines defining a circle to thereby define a plurality of circles during rotation thereof, each of said plurality of circles defined by the tips of the blades of said main turbines being spaced from said first axis a distance substantially equal to the radius of said first circle so that the main turbine blades are not disturbed by the wake of said auxiliary turbine blades.

15. A rotor blade system integrated wind turbine as defined in claim 14, wherein said main turbine blades rotate in a direction opposite to the direction of rotation of said auxiliary turbine blades.

16. A rotor blade system integrated wind turbine as defined in claim 14, wherein said main and auxiliary turbine blades rotate in the same direction.

17. A rotor blade system integrated wind turbine as defined in claim 14, wherein each of said main turbines is supported by a supporting extender, the extenders being connected to a common main rotor hub assembly, all of said main turbine blades rotating in one direction, and said main rotor hub assembly and said extenders rotating in the opposite direction so that the orbital tip speed of the main turbine is counter balanced by the opposed rotation of the main rotor hub assembly and the extenders.

18. A rotor blade system integrated wind turbine as defined in claim 14, wherein said auxiliary turbine and said main turbines have outputs, said gear assembly including means for mechanically combining said outputs to provide a single system output.

19. A rotor blade system integrated wind turbine as defined in claim 14, wherein each of said main turbines further comprises an input shaft positioned perpendicular to the plurality of axes, a horizontal shaft collinear with one of said axes, a first bevel gear connected to the input shaft, and a second bevel gear meshed with said first bevel gear and connected to said horizontal shaft for rotation about one of said axes.

20. A rotor blade system integrated wind turbine as defined in claim 19, wherein said gear assembly comprises a main input shaft collinear with said first axis, each of said main turbine input shafts having an inner end, said main turbine input shaft being perpendicular to said first axis and rotatable, a first bevel gear connected to each of said inner ends and being rotatable with said main turbine input shafts, and a fixed bevel gear meshed with each of said first bevel gears.

* * * * *